United States Patent
Dechet et al.

(10) Patent No.: US 11,939,436 B2
(45) Date of Patent: Mar. 26, 2024

(54) METHOD FOR PRODUCING A POPULATION OF PARTICLES OF POLYETHYLENE TEREPHTHALATE OR POLYBUTYLENE TEREPHTHALATE OR OF A COPOLYMER COMPRISING PET AND/OR PBT

(71) Applicant: Evonik Operations GmbH, Essen (DE)

(72) Inventors: Maximilian Alexander Dechet, Zirndorf (DE); Stephanie Kloos, Huenenberg (CH); Jochen Schmidt, Schwarzenbach am Wald (DE); Wolfgang Peukert, Markt Schwaben (DE)

(73) Assignee: Evonik Operations GmbH, Essen (DE)

( * ) Notice: Subject to any disclaimer, the term of this patent is extended or adjusted under 35 U.S.C. 154(b) by 792 days.

(21) Appl. No.: 17/042,097

(22) PCT Filed: Mar. 26, 2019

(86) PCT No.: PCT/EP2019/057504
§ 371 (c)(1),
(2) Date: Sep. 26, 2020

(87) PCT Pub. No.: WO2019/185582
PCT Pub. Date: Oct. 3, 2019

(65) Prior Publication Data
US 2021/0108037 A1  Apr. 15, 2021

(30) Foreign Application Priority Data
Mar. 27, 2018 (EP) .................................. 18164397

(51) Int. Cl.
*C08J 3/14* (2006.01)
*B29B 9/10* (2006.01)
(Continued)

(52) U.S. Cl.
CPC .................. *C08J 3/14* (2013.01); *B29B 9/10* (2013.01); *B29C 64/153* (2017.08); *B33Y 70/00* (2014.12); *C08J 2367/02* (2013.01)

(58) Field of Classification Search
CPC .... C08J 3/14; C08J 2367/02; B29B 2009/125
See application file for complete search history.

(56) References Cited

U.S. PATENT DOCUMENTS

| 4,078,916 A | 3/1978 | Gerber et al. |
| 5,527,877 A | 6/1996 | Dickens, Jr. et al. |

(Continued)

FOREIGN PATENT DOCUMENTS

| DE | 2 253 361 A1 | 5/1974 |
| DE | 26 26 358 A1 | 12/1976 |

(Continued)

OTHER PUBLICATIONS

Aczel et al. Correlation of Mass Spectra with Structure in Aromatic Oxygenated Compounds, Aromatic Alcohols and Phenols, Analytical Chemistry1960 vol. 32 (13), pp. 1819-1822 (Year: 1960).*
Smith et al. Aromatic Alcohols and Carbonyl Compounds, Aromatic Chemistry 1969, pp. 144-175 (Year: 1969).*
(Continued)

*Primary Examiner* — Marc S Zimmer
*Assistant Examiner* — Surbhi M Du
(74) *Attorney, Agent, or Firm* — Grüneberg and Myers PLLC

(57) ABSTRACT

The invention concerns a method for producing a population of particles of a polymer, wherein the polymer is polybutylene terephthalate (=PBT) or polyethylene terephthalate
(Continued)

Figure 1:
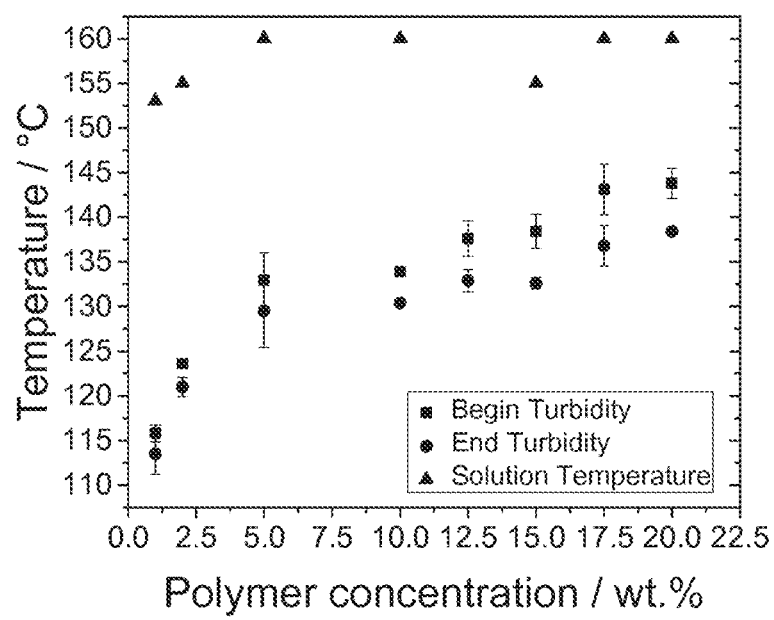

(=PET) or a copolymer comprising polybutylene terephthalate and/or polyethylene terephthalate, wherein the polymer is dissolved in an organic solvent which solvent is selected such that it completely solubilizes the polymer only at a temperature of the solvent above 100° C., wherein the method comprises heating the solvent and the solid polymer immersed in the solvent at least to a first temperature, at which first temperature the polymer completely dissolves, cooling the solution until a second temperature is reached at which second temperature clouding of the solution starts, further cooling the solution at a rate in a range of 0.05 ° C./min to 5° C./min or keeping the solution at the second temperature or at a temperature up to 3° C. below the second temperature for at least 5 min and then cooling the solution at a rate in a range of 0.05° C./min to 5° C./min, wherein cooling occurs at least until a third temperature is reached at which third temperature turbidity does not further increase, and separating the particles formed during step b) or c) from the solution.

15 Claims, 10 Drawing Sheets

(51) Int. Cl.
  *B29C 64/153* (2017.01)
  *B33Y 70/00* (2020.01)

(56) References Cited

U.S. PATENT DOCUMENTS

| | | | |
|---|---|---|---|
| 8,414,281 B2 * | 4/2013 | Schleiss | B22F 10/28 425/375 |
| 2011/0263730 A1 * | 10/2011 | Aridomi | C08J 3/14 521/88 |
| 2012/0270983 A1 * | 10/2012 | Skillman | C09D 167/02 524/360 |

FOREIGN PATENT DOCUMENTS

| | | |
|---|---|---|
| EP | 0 376 653 A2 | 7/1990 |
| EP | 0 742 251 A1 | 11/1996 |
| EP | 0 850 982 A2 | 1/1998 |
| JP | S 57-172923 A | 10/1982 |
| JP | H 08-176310 A | 7/1996 |

OTHER PUBLICATIONS

International Search Report, International Application No. PCT/EP2019/057504 (published under WO 2019/185582), 3 Pages (dated Jun. 3, 2019).

Written Opinion, International Application No. PCT/EP2019/057504 (published under WO 2019/185582), 6 pages (dated Jun. 3, 2019).

Nichols et al., "Preparation of Small Poly(butylene Terephthalate) Spheres By Crystallization from Solution," Journal of Polymer Science: Part B: Polymer Physics, vol. 32, pp. 573-577 (1994).

Abstract, Database WPI, Week 199637, AN 1996-368315 (Jul. 9, 1996).

* cited by examiner

METHOD FOR PRODUCING A POPULATION OF PARTICLES OF POLYETHYLENE TEREPHTHALATE OR POLYBUTYLENE TEREPHTHALATE OR OF A COPOLYMER COMPRISING PET AND/OR PBT

CROSS-REFERENCE TO RELATED APPLICATIONS

This application is a 371 National Phase of International Patent Application No. PCT/EP2019/057504 filed on Mar. 26, 2019, which claims priority to European Patent Application No. 18164397.4 filed on Mar. 27, 2018, the content of each of which applications is incorporated herein by reference.

The invention concerns a method for producing a population of particles of a polymer, in which population at least 96% of the particles may have a particle size in the range of 5 μm to 200 μm, wherein the polymer is polyethylene terephthalate (=PET) or polybutylene terephthalate (=PBT) or a copolymer comprising PET and/or PBT.

DE 26 26 358 A1 discloses a method for recovery of polyester contained in polyester containing material without degradation or deterioration of the polyester. The method involves dissolving the polyester in a polar solvent at an elevated temperature under conditions chosen so that the polyester content of the material is not decreased. The resulting hot solution is cooled to a temperature at which the polyester contained in the solution begins to crystalize. The cooling rate is regulated for controlling the size of the precipitating particles of polyester.

DE 2 253 361 discloses production of polyethylene terephthalate powder for coating metal surfaces. The powder is produced by first forming a concentrated solution of the polyethylene terephthalate in gamma-butyrolactone at 150° C. to 210° C. which is then transformed into a gel by cooling the solution to a temperature below 140° C. This gel is then broken up by crushing and freed of solvent in known manner. Resulting agglomerates can then be converted by grinding to powder having particle sizes from about 30 μm to about 500 μm.

JP S57 172923 A discloses production of polybutylene terephthalate polymer fine particles by dissolving polybutylene terephthalate polymer in a specific lactam at 150° C. to 250° C. and precipitating the polymer from the solution by cooling.

JP H08 176310 A discloses production of crystalline polyester spherical particles by heating and dissolving the polyester in a solvent, cooling the solution to induce phase separation to form a heterogeneous solution in which the polyester is phase-separated as independent single spherulite particles, using a solvent for cleaning the heterogeneous solution to dissolve, clean and remove the phase-separation solvent only, precipitating and separating the particles and filtrating and drying the precipitate to obtain the independent spherulite crystalline polyester particle powder. The polyester may be a polyethylene terephthalate, a polybutylene terephthalate or a derivative or a copolymer thereof. The solvent may be neopentyl glycol diglycidyl ether.

U.S. Pat. No. 5,527,877 A discloses a laser-sinterable powder that has a two-tier distribution in which substantially no primary particles have an average diameter greater than 180 μm, provided further that the number average ratio of particles smaller than 53 μm is greater than 80%, the remaining larger particles being in the size range from 53 μm to 180 μm. The powder may be made of nylon, PBT or polyacetal.

EP 0 742 251 A1 discloses a process for recycling mixed polymer containing PET from a mixed polymer recycle stream. The process comprises contacting the mixed polymer recycle stream with a solvent which selectively dissolves the polyester, separating the selective solvent containing PET from the residual mixed polymer, cooling the selective solvent to precipitate the polyester and separating the polyester thereby recovered.

EP 0 850 982 A2 discloses a process for recovering polyester polymer as a microporous solid from a mixed polymer recycle stream. The method comprises contacting the mixed polymer recycle stream at elevated temperature with a selective solvent in which polyester polymers are soluble and other polymers present in the recycle stream are substantially insoluble to form a solution of polyester polymer in the selective solvent. If the concentration of polyester in said solution is below 35 wt. % it is increased to above that value. The selective solvent solution is cooled to form a solid material having an interconnected phase of solid polymer domains rich in polyester polymer and a phase of solvent domains rich in selective solvent. The selective solvent is extracted from the solid material to form a microporous solid.

EP 0 376 653 A2 discloses a non-attritive method for making fine particles of crystallizable polyester, polycarbonate or polyamide polymers or blends thereof which comprises heating a mixture of the polymer in a moderate solvent for the polymer to a temperature above the melting point of the polymer when in the moderate solvent and then cooling whereupon the particles re-crystalize from the mixture.

From Nichols, M. E. and Robertson, R. E, Journal of Polymer Science: Part B: Polymer Physics, Vol. 32, 573-577 (1994) a preparation of small poly(butylene terephthalate) spheres by crystallization from a solution in a diglycidyl ether of bisphenol-A epoxy is known. PBT was dissolved in this epoxy at 230° C. Solutions of PBT were then cooled to a specific temperature and held for various times, typically 155° C. for 20 min, during which time the PBT precipitated from solution. The PBT particles were then separated from the liquid epoxy resin by repeated washing with acetone. The particles were dried in an oven at 50° C. for 4 h to remove any residual solvent. The dried particles had a diameter of approximately 23 μm.

The problem to be solved by the present invention is to provide an alternative method for producing particles of a polymer, to provide the particles produced by that method and a use of the particles produced according to that method. The particles shall be relatively spherical and/or shall have a relative narrow range of particle sizes, in particular without applying a selection process.

The problem is solved by subject-matter of claims 1, 16 and 17 of the present invention. Embodiments of the invention are subject-matter of claims 2 to 15.

According to the invention a method for producing a population of particles of a polymer is provided. In this population at least 96%, in particular at least 97%, in particular at least 98%, in particular at least 99%, in particular 100%, of the particles may have a particle size in the range of 5 μm to 200 μm. The polymer is PET or PBT or a copolymer comprising PET and/or PBT. The polymer is dissolved in an organic solvent which solvent is selected such that it completely solubilizes the polymer only at a temperature of the solvent above 100° C. The method comprises the following steps:

a) heating the solvent and the solid polymer immersed in the solvent at least to a first temperature, at which first temperature the polymer completely dissolves as indicated by a resulting solution showing no turbidity, wherein the weight of the polymer in relation to the total weight of the solvent and the polymer is in the range of 0.25 wt. % to 50 wt. %, b) cooling the solution, wherein the cooling is practiced until a second temperature is reached at which second temperature clouding of the solution starts, c) further cooling the solution at a rate in a range of 0.05° C./min to 5° C./min, in particular 0.1° C./min to 2° C./min, in particular 0.4° C./min to 1.6° C./min, in particular 0.6° C./min to 1.5° C./min, or keeping the solution at the second temperature or at a temperature up to 3° C. below the second temperature for at least 5 min, in particular at least 10 min, in particular at least 20 min, in particular at least 30 min, and then cooling the solution at a rate in a range of 0.05° C./min to 5° C./min, in particular 0.1° C./min to 2° C./min, in particular 0.4° C./min to 1.6° C./min, in particular 0.6° C./min to 1.5° C./min, wherein cooling occurs at least until a third temperature is reached at which third temperature turbidity does not further increase, and d) separating the particles formed during step b) or c) from the solution.

The solvent in which the PBT or the PBT comprising copolymer is dissolved in step a) comprises or consists of a cyclic ketone, a lactone, an aromatic alcohol, an aromatic aldehyde, an aromatic ester comprising only one ester group or a glycol ether comprising at most 10, in particular 9, in particular 8, in particular 7, in particular 6, carbon atoms in total. The solvent, in which the PET or the PET comprising copolymer is dissolved in step a) comprises or consists of a cyclic ketone, a lactone, an aromatic alcohol or a non-aromatic cyclic or an aliphatic alcohol, an aromatic aldehyde or an aromatic ester comprising only one ester group.

A "cyclic ketone" is a carbocyclic ketone, i. e., a cyclic ketone in which all atoms of the ring system are carbon atoms. Therefore, a lactam or an alkylene carbonate is not comprised by the term "cyclic ketone". In particular, the cyclic ketone can be a non-aromatic cyclic ketone. The inventors recognized that use of a lactam as a solvent and of other solvents than the solvents mentioned above may result in a degradation of the polymer dissolved in it and/or in non-spherical particles and/or in particles having a relatively high content of residual solvent.

An aromatic ester comprising only one ester group particularly excludes phthalates and bisphenol-A-diglycidyl ether. A cyclic ketone containing at least 4 carbon atoms in its ring structure also excludes alkylene carbonates. Phthalates, bisphenol-A-diglycidyl ether and alkylene carbonates seem not to be suitable for producing relatively spherical particles having a relative narrow range of particle sizes.

The cyclic ketone may contain at least 4 carbon atoms in its ring structure, the lactone, in particular the lactone in which the PBT or the PBT comprising copolymer is dissolved, may be gamma-butyrolactone, the aromatic aldehyde may be benzaldehyde, the aromatic alcohol, in particular the aromatic alcohol in which the PBT or the PBT comprising copolymer is dissolved, may be benzyl alcohol, the aliphatic alcohol may be 1-pentanol, the aromatic ester, in particular the aromatic ester in which the PET or the PET comprising copolymer is dissolved, may be benzyl benzoate and the glycol ether may be di(ethylene glycol) ethyl ether.

Di(ethylene glycol) ethyl ether means here and in the following di(ethylene glycol) monoethyl ether.

The aromatic alcohol in which the PET or the PET comprising copolymer is dissolved may comprise at most 6 carbon atoms in total. The term "aromatic alcohol" means an aryl alcohol.

In an embodiment of the invention the cyclic ketone is cyclopentanone or cyclohexanone. Both solvents are very suitable for producing a population of particles of PBT or PET or a copolymer comprising PBT and/or PET.

The first temperature may be determined by heating the solvent and the solid polymer immersed in the solvent until a resulting solution shows no turbidity and measuring the temperature at which turbidity completely disappears. Turbidity may be measured by measuring light scattering. The second temperature is the temperature at which the polymer particles start to form upon cooling. The third temperature is the temperature at which no further particles are formed upon cooling.

A mixing of the solvent and/or the solution during steps a) to c) may occur, in particular independently for each of steps a), b) and c) either passively by convection or actively by agitating the solvent and/or the solution, e. g. by stirring. In an embodiment the solution is agitated during step c) such that a laminar flow forms in the predominant part, in particular in more than 60%, in particular in more than 70%, in particular in more than 80%, in particular in more than 85%, of the solution which laminar flow is maintained at least during the predominant time of performance of step c), in particular during more than 60%, in particular during more than 70%, in particular during more than 80%, in particular during more than 85%, in particular during 100%, of the time of performance of step c). Since small turbulent flows always occur at surfaces contacting a laminarly flowing liquid a laminar flow in 100% of the solution is impossible. The laminar flow in the predominant part of the solution results in formation of very uniform and spherical particles.

Independently for each of steps a), b) and c) either turbidity of the solution is measured during the respective step or the first, second and third temperature, respectively, is determined in a separate procedure. The separate procedure may be performed only once such that the respective first, second and/or third temperature is/are known when performing steps a), b) and/or c). The separate procedure can be an experiment, in which the polymer is dissolved in the same solvent at the same concentration as in the method to be performed according to the invention. This separate procedure may also be a method according to the invention performed previously in which method the respective temperature has been measured.

"Clouding" means the formation of turbidity. The abbreviation "wt. %" means "percent by weight". The particle size is understood to be the volume equivalent spherical diameter (=VESD). This particle size can be determined by static light scattering, laser diffraction, microscopy, in particular optical microscopy, followed by image analysis, sedimentation analysis and by use of a disc centrifuge.

The copolymer may be a copolymer comprising more than 50%, in particular more than 60%, in particular more than 70%, in particular more than 80%, in particular more than 90%, in particular more than 95%, PET and/or PBT.

The polymer may be present in the form of pieces of the polymer, e. g. in the form of a commercially available granulate of the polymer or in the form of pieces obtained by shredding of beverage bottles in case of PET or PBT plastic waste in case of PBT. The cooling of the solution may be performed actively, e. g. by use of a heat exchanger, or by letting the solution cool down by normal temperature exchange with the surrounding. In this case it may be required to heat the solution during step c) to prevent a cooling rate exceeding the range of 0.05° C./min to 5° C./min, in particular 0.1° C./min to 2° C./min, in particular 0.4° C./min to 1.6° C./min, in particular 0.6° C./min to 1.5° C./min, or for keeping the solution at the second temperature for at least 5 min, in particular at least 10 min, in particular at least 20 min, in particular at least 30 min.

An advantage of the method according to the invention is that the population of particles generated by this method has a relative narrow range of particle sizes, i. e. the method results in a very narrow particle size distribution immediately resulting from the method. For many applications an additional selection of particles having a specific size, e. g. by sieving is not required. Furthermore, the particles resulting from the method are relatively spherical. This results in a high packing density and bulk density as well as a good flowability of the particles. Owing to these features the population of particles produced by the method is ideal for use in selective laser sintering (=SLS), selective laser melting (=SLM), a powder bed fusion processes or laser beam melting of a polymer. Owing to the uniformity of the particles and their good flowability fine structures can be produced having a wall thickness as thin as the maximal diameter of the particles.

The advantageous features of the particles result from the specific combination of the procedure and the solvent used in the procedure. Since the solvent influences the shape and particle size distribution of the particles, the features of the particles can be better controlled if no further solvent, in particular no solvent causing precipitation of the particles, is added in steps b) and/or c).

The starting of clouding at the second temperature indicates a fluid-fluid phase separation. During this phase separation the former homogeneous polymer solution separates in two phases. At the second temperature droplets of a polymer rich phase form in a matrix of a polymer poor outer phase. The concentration of the polymer in the droplets is higher than the total polymer concentration when starting the cooling process. The inventors assume that the reason for the generation of relative uniform and spherical particles is that stopping cooling or cooling down only slowly after the second temperature is reached, allows the very small droplets formed when the clouding of the solution starts at the second temperature to form bigger droplets by diffusion of residual polymer from the matrix into the droplets, as well as by Ostwald ripening and by coalescence. The inventors further assume that growth of most of the droplets is stopped by the begin of crystallization of the polymer in the droplets. Crystallization of the polymer inside the droplets can start at isothermal holding at the second temperature or upon further cooling. A homogenous temperature profile in the solution results in a crystallization that starts in all droplets relatively simultaneously. This leads to particles which are relatively uniform in size and relatively spherical. A homogenous temperature profile is supported by slow cooling after the second temperature is reached or by keeping the solution at the second temperature or at a temperature up to 3° C. below the second temperature for at least 5 min.

In an embodiment of the invention the solution is kept at the second temperature in step c) for a time in the range of 5 min to 150 min, in particular 10 min to 130 min, in particular 20 min to 115 min, in particular 30 min to 100 min, in particular 40 min to 90 min, in particular 50 min to 75 min, in particular 55 min to 70 min. Prolonging the time at which the solution is kept at the second temperature may increase uniformity and/or size of the particles.

Sphericity, uniformity and/or narrow range of particle sizes can be increased when cooling in step b) is interrupted at a fourth temperature in the range of 12° C. to 0.01° C., in particular 11.5° C. to 1° C., in particular 11° C. to 2° C., in particular 10° C. to 3° C., in particular 8° C. to 4° C., above the second temperature by keeping the solution at said fourth temperature for at least 5 min, in particular at least 10 min, in particular at least 15 min, wherein the second temperature is determined before in a separate procedure. The separate procedure can be an experiment, in which the polymer is dissolved in the same solvent at the same concentration as in the procedure at which the cooling shall be interrupted at the fourth temperature in step b). In this separate procedure turbidity is measured during continuously cooling down, e. g. at a rate of 1 to 5° C. per min, and the second temperature is determined as the temperature at which clouding starts. The separate procedure may also be a method according to the invention performed previously.

The reason for the effect of the interruption of cooling down in step b) may be that very small polymer rich droplets could be formed before clouding of the solution can be observed or even measured. In these very small droplets nucleation may start. Nuclei formed during this process may serve as starting structure for heterogeneous nucleation forming the particles, in particular at the second temperature and below the second temperature but also at the fourth temperature.

The solution may be kept at the fourth temperature in step b) for a time in the range of 5 min to 150 min, in particular 10 min to 120 min, in particular 15 min to 60 min, in particular 15 min to 35 min, in particular 20 min to 30 min.

With respect to a selection of a suitable organic solvent, the total Hansen solubility parameter can be used. The total Hansen solubility parameter δT can be calculated according to the formula $\delta_T^2 = \delta_D^2 + \delta_P^2 + \delta_H^2$ or by use of a HSPiP Software available from Dr. techn. Charles M. Hansen, Jens Bornøsvej 16, 2970 Hørsholm, Denmark or via www.hansen-solubility.com, wherein $\delta_D$, $\delta_P$ and $\delta_H$ are determined empirically according to a method developed by Dr. techn. Charles M. Hansen and explained at www.hansen-solubility.com. Examples of total Hansen solubility parameters $\delta_T$ are given in following Table I:

TABLE I

| Polymer/Solvent | $\delta_D$ [MPa$^{1/2}$] | $\delta_P$ [MPa$^{1/2}$] | $\delta_H$ [MPa$^{1/2}$] | $\delta_T$ [MPa$^{1/2}$] | $\delta_{Hildebrand}$ [MPa$^{1/2}$] |
|---|---|---|---|---|---|
| PBT | 18 | 5.6 | 8.4 | 20.64 | 22.4 [1] |
| PET | 18.2 | 6.4 | 6.6 | 20.39 | 21.9 [4] |
| Cyclopentanone | 17.9 | 11.9 | 5.2 | 22.11 | 21.3 [2] 21.3 |
| Ethylene carbonate | 18 | 21.7 | 5.1 | 28.65 | 30.1 |
| Propylene carbonate | 20 | 18 | 4.1 | 27.22 | 27.2 |
| Benzyl alcohol | 18.4 | 6.3 | 13.7 | 23.79 | 24.8 |
| Benzaldehyde | 19.4 | 7.4 | 5.3 | 21.43 | 19.2 |
| Di(ethylene glycol) ethyl ether [3] | 16.1 | 9.2 | 12.2 | 22.20 | N/A |
| Dimethyl phthalate | 18.6 | 10.8 | 4.9 | 22.06 | 21.9 |
| Diethyl phthalate | 17.6 | 9.6 | 4.5 | 20.55 | 20.5 |
| Dibutyl phthalate | 17.8 | 8.6 | 4.1 | 20.19 | 19.0 |
| Naphthalene | 19.2 | 2 | 5.9 | 20.19 | 20.3 |
| Benzyl benzoate | 20 | 5.9 | 5.2 | 21.28 | N/A |

TABLE I-continued

| Polymer/Solvent | $\delta_D$ [MPa$^{1/2}$] | $\delta_P$ [MPa$^{1/2}$] | $\delta_H$ [MPa$^{1/2}$] | $\delta_T$ [MPa$^{1/2}$] | $\delta_{Hildebrand}$ [MPa$^{1/2}$] |
|---|---|---|---|---|---|
| 1-Pentanol | 15.9 | 16.6 | 13.9 | 21.93 | 21.7 [5] |
| gamma-Butyrolactone | 18 | 12.1 | 7.4 | 25.58 | 25.8 |

[1] http://polymerdatabase.com/polymers/polybutyleneterephthalate.html
[2] http://old.iupac.org/publications/pac/1999/71_04_pdf/abboud.pdf
[3] http://msdssearch.dow.com/PublishedLiteratureDOWCOM/dh_012d/0901b8038012d976.pdf
[4] http://polymerdatabase.com/polymer%20physics/SolubilityParameter.html
[5] CRC Handbook of Solubility Parameters and Other Cohesion Parameters, Second Edition-ISBN 10: 0849301769; ISBN 13: 9780849301766
$\delta_D$ [MPa$^{1/2}$] = energy from dispersion forces between molecules
$\delta_P$ [MPa$^{1/2}$] = energy from dipolar intermolecular forces between molecules
$\delta_H$ [MPa$^{1/2}$] = energy from hydrogen bonds between molecules
$\delta_T$ [MPa$^{1/2}$] = total Hansen solubility parameter
$\delta_{Hildebrand}$ [MPa$^{1/2}$] = Hildebrand solubility parameter Hildebrand solubility parameters are also available from Polymer Handbook, 4$^{th}$ Edition, J. Brandrup, ISBN-10: 0471479365; ISBN-13: 978-0471479369.

A suitable solvent may be a solvent having a total Hansen solubility parameter in the range of 20.1 MPa$^{1/2}$ to 25.7 MPa$^{1/2}$, in particular in the range of 21.2 MPa$^{1/2}$ to 25.7 MPa$^{1/2}$, in particular in the range of 21.2 MPa$^{1/2}$ to 22.3 MPa$^{1/2}$, in particular in the range of 21.4 MPa$^{1/2}$ to 22.25 MPa$^{1/2}$, in particular in the range of 22.1 MPa$^{1/2}$ to 22.2 MPa$^{1/2}$.

Owing to the uniformity of the particles and their spherical shape they have a relatively high knock density. This can be expressed as Hausner ratio. The Hausner ratio is the ratio of the freely settled bulk density of a powder to the tapped bulk density of the powder. The Hausner ratio is correlated to the flowability of a powder. The Hausner ratio is not an absolute property of a material. Its value can vary depending on the methodology used to determine it. For the purpose of the present invention the Hausner ratio is determined by use of the commercially available tapping device SVM10, purchased from ERWEKA GmbH, Heusenstamm, Germany at 100 strokes having an amplitude of 2 mm and a stroke frequency of 4 Hz.

The Hausner ratio of the particles can be between 1.00 and 1.25, in particular between 1.00 and 1.15, in particular between 1.00 and 1.10.

50% of the particles may have a volume equivalent spherical diameter (=VESD) that is smaller than or equal to 10 μm to 150 μm, in particular smaller than or equal to 30 μm to 90 μm, in particular smaller than or equal to 35 μm to 90 μm, in particular smaller than or equal to 40 μm to 90 μm, in particular smaller than or equal to 45 μm to 90 μm.

A measure for the width of the particle size distribution is the span. The span is defined as the ratio of the difference between the VESD where 90% of the particle population lies below (=$x_{90,3}$) and the VESD where 10% of the particle population lies below (=$x_{10,3}$) to the VESD where 50% of the particle population lies below (=$x_{50,3}$), i. e. the span is (($x_{90,3}$−$x_{10,3}$)/$x_{50,3}$).

The span of the particles may be in the range of 1.0 to 1.75, in particular in the range of 1.0 to 1.5, in particular in the range of 1.0 to 1.35, in particular in the range of 1.0 to 1.25.

In an embodiment the first temperature is a temperature below the melting point or melting range of the polymer. The solvent in which PET or the PET comprising copolymer is dissolved in step a) may be cyclopentanone, benzyl benzoate, benzaldehyde or 1-pentanol. The solvent in which PBT or the PBT comprising copolymer is dissolved in step a) may be cyclopentanone, benzaldehyde or di(ethylene glycol) ethyl ether. The inventors found that the selection of the solvent influences sphericity of the resulting particles and particle size distribution of the resulting population of particles. The afore-mentioned solvents result in particular spherical particles in a population of particles having a narrow range of particle sizes. This applies in particular for cyclopentanone as solvent for PET as well as PBT and the PET and/or PBT comprising copolymer.

Furthermore, the inventors recognized that cyclopentanone dissolves PET as well as PBT and the PET and/or PBT comprising copolymer at a relative low temperature far below the melting point or melting range of the polymer. This solution temperature is the first temperature according to claim 1. It depends on the solvent and on the concentration of the polymer in the solvent. For cyclopentanone it is in the range of 152° C. to 161° C. for PBT and in the range of 144° C. to 181° C. for PET. The melting range of PBT is 226° C. to 231° C. and that of PET is 250° C. to 260° C.

A further advantage of cyclopentanone was found when investigating residual amount of solvent remaining in the particles after drying. PBT particles precipitated from PBT dissolved in cyclopentanone contain a much smaller amount of residual solvent than PBT particles precipitated from PBT dissolved in propylene carbonate and PET particles precipitated from PET dissolved in cyclopentanone contain a much smaller amount of residual solvent than PET particles precipitated from PET dissolved in dimethyl phthalate. This shows the superiority of cyclopentanone as solvent for the precipitation of the particles. A low residual content of solvent is a big advantage for the production of articles from the particles by use of selective laser sintering (=SLS), selective laser melting (=SLM), a powder bed fusion processes or laser beam melting of a polymer because the solvent contained in the particles evaporates in all these processes. Evaporation of the solvent from the particles results in a shrinking of the particles during production of the articles and therewith to a loss of quality and precision. The less solvent is entrapped in the particles the more precisely articles can be produced by use of the mentioned processes and the higher is the quality of the resulting articles.

It is possible to add at least one additive to the solution during step a) or step b) before the second temperature is reached or to the solvent in step a). The additive may be an additive for supporting nucleation or an additive supporting flow of the final particles. In both cases this additive may be pyrogenic silica, in particular hydrophobic pyrogenic silica, pyrogenic metal oxide or carbon black. The carbon black may be PRINTEX® U Powder purchased from The Cary Company, Addison, Ill. 60101, USA. The pyrogenic metal oxides may be Aeroxide® Alu C, Aeroxide® Alu 65, Aeroxide® Alu 130, Aeroxide® Alu C 805; Aeroxide® TiO2 P25, Aeroxide® TiO2 P90, Aeroxide® TiO2 T 805 and Aeroxide® TiO2 NKT 90 purchased from Evonik Resource Efficiency GmbH, Rodenbacher Chaussee 4, 63457 Hanau-Wolfgang, Germany. The hydrophobic pyrogenic silica may be Aerosil® R 106 or Aerosil® R 812 purchased from Evonik Resource Efficiency GmbH, Hanau-Wolfgang, Germany or hydrophobic HDK® pyrogenic silica purchased from Wacker Chemie AG, Munich, Germany, such as HDK® 20 or HDK® 30.

Furthermore, the additive may be an additive for stabilizing the formed polymer rich droplets, such as a polysorbate, in particular polysorbate 85. Polysorbate 85 is distributed under the commercial name Tween® 85, e. g. by Merck KGaA, Darmstadt, Germany.

Each of the additives may be added in a concentration range of 0.01 wt. % to 3 wt. %, in particular 0.05 wt. % to 2 wt. %, in particular 0.1 wt. % to 1 wt. %. The effect of these additives is that the generation of very fine particles is prevented and that the flowing features of the population of particles is improved. Furthermore, porosity of the resulting particles can be reduced and sphericity of the resulting particles can be increased by the additives, in particular by the polysorbate. Instead or in addition to the mentioned additives it is also possible to add a pigment, e. g. titanium dioxide or soot as pigment for supporting laser energy absorption, and/or any other additive providing a specific function, such as a thermal stabilization, an antistatic effect or a flame retarding effect. The additive may also be an additive for stabilization of the particles such as an antioxidant. The antioxidant protects the particles against thermo-oxidative degradation. It can be a primary antioxidant, in particular a secondary aromatic amine or a phenolic antioxidant, in particular a sterically hindered primary phenolic antioxidant, in particular pentaerythritol tetrakis(3-(3,5-di-tert-butyl-4-hydroxyphenyl)propionate) that can be purchased from BASF Corporation under the tradename Irganox® 1010. The antioxidant can also be a secondary antioxidant together with a primary antioxidant. The secondary antioxidant can be a thioether, an organic sulfide or an organo-phosphite such as tris[2-[[2,4,8,10-tetra-tert-butyldibenzo[d,f][1,3,2]dioxaphosphepin-6-yl]oxy]ethyl]amine that can be purchased from BASF Corporation under the tradename Irgafos® 12.

An additive having an antistatic effect may be an alkyl sulphonate. An additive having a flame retarding effect may be aluminum diethyl phosphinate (AlPi) in combination with melamine polyphosphate (MPP).

The particles separated from the solution in step d) may be washed and/or dried and/or desagglomerated. Drying may be performed, e. g., in a vacuum drying oven at a pressure of about 600 mbar and 45° C. for about 24 hours. "Desagglomerating particles" means that particles formed in the method according to the invention which particles are attached to each other, i. e. "agglomerated", are separated from each other. The size of the particles remains, at least essentially, the same. A desagglomeration may be achieved by agitation during or after drying. For example, desagglomeration can be achieved by agitating agglomerated particles in a sieve until all particles passed the sieve, in particular a sieve having a mesh of the maximal particle size, e. g. a 200 μm mesh. Since no residual particles remain in the sieve, the sieving is not a selection process.

The weight of the polymer in relation to the total weight of the solvent and the polymer may be in the range of 0.4 wt. % to 45 wt. %, in particular 0.5 wt. % to 40 wt. %, in particular 0.6 wt. % to 35 wt. %, in particular 0.7 wt. % to 30 wt. %, in particular 0.75 wt. % to 25 wt. %, in particular 1 wt. % to 15 wt. %. By choosing an appropriate polymer concentration a more spherical form of the particles and/or a narrower particle size distribution can be realized.

The invention further concerns a population of particles produced according to the method of the invention. The particles differ from known particles by the relatively spherical form of the particles and the very narrow range of particle size distribution, in particular if no selection process is applied to the population of particles.

The invention further concerns the use of the population of particles produced according to the method of the invention for additive manufacturing such as selective laser sintering (=SLS), selective laser melting (=SLM), a powder bed fusion processes or laser beam melting of a polymer.

Figure 2:
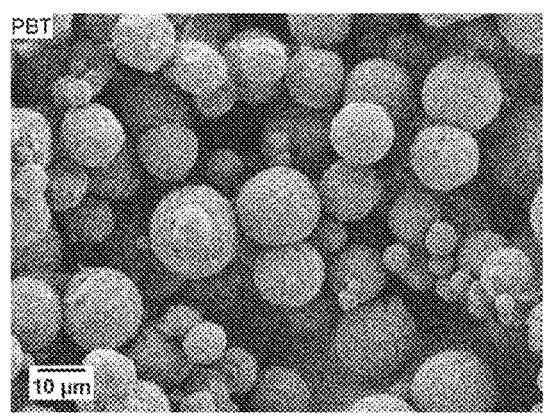
Figure 3:
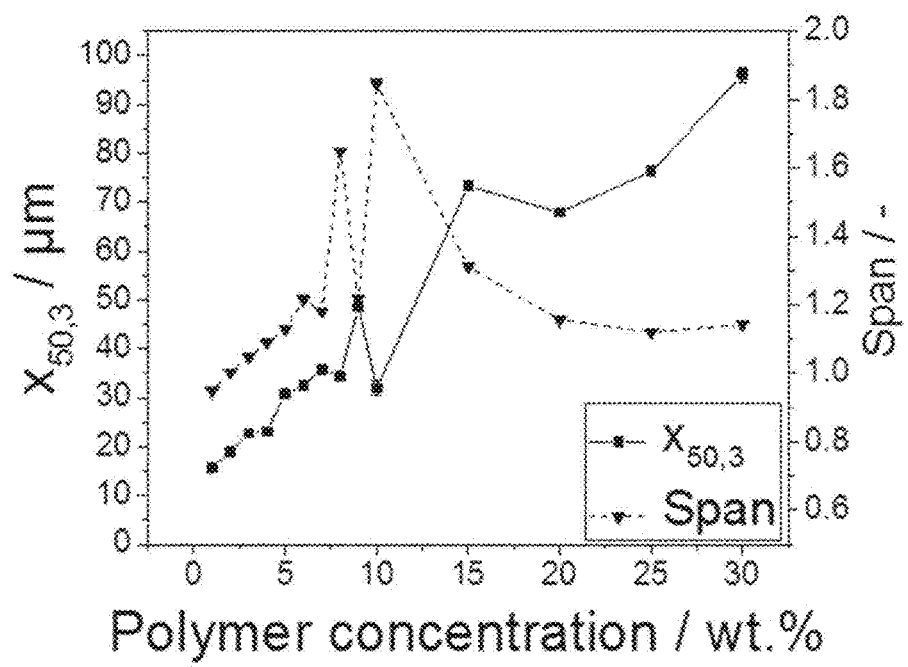
Figure 4:
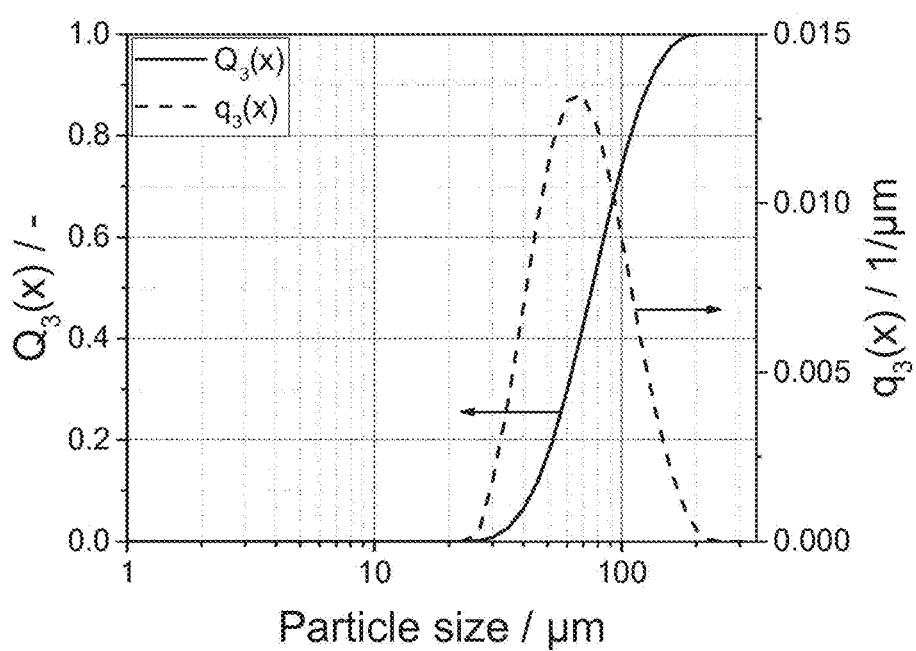
Figure 5:
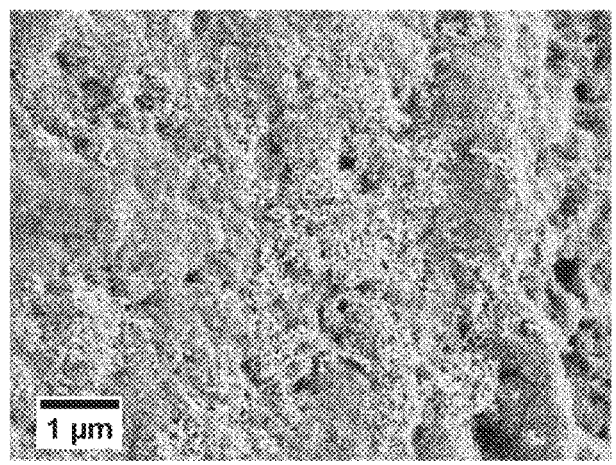
Figure 6:
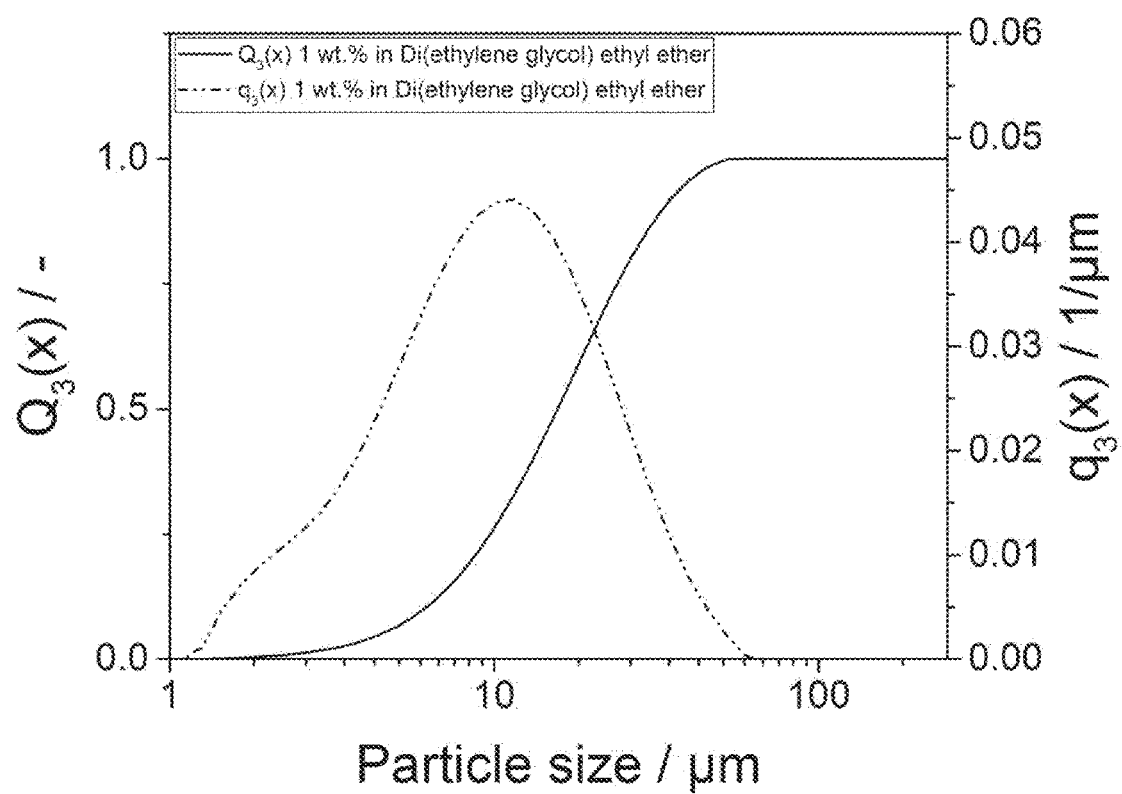
Figure 7A:
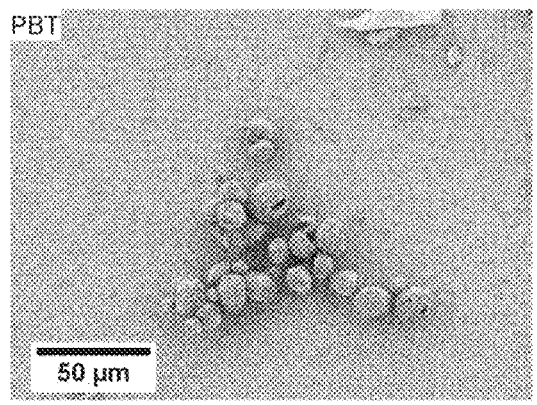
Figure 7B:
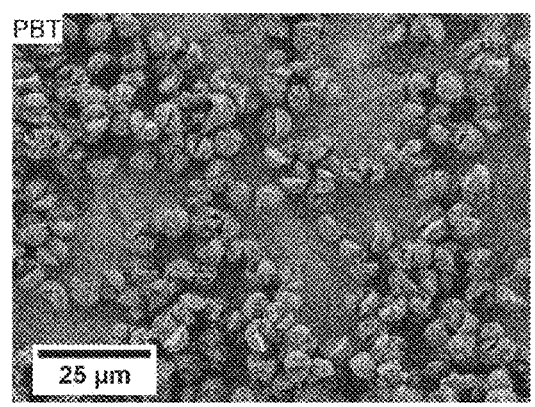
Figure 7C:
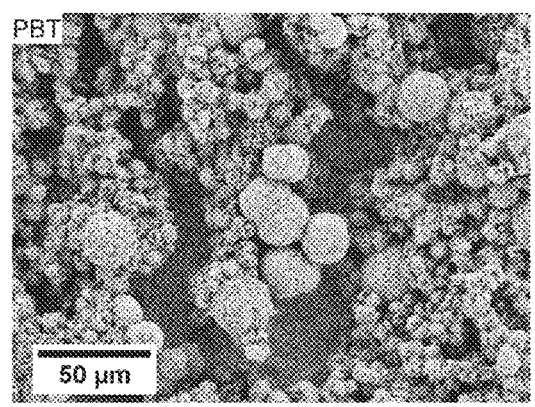
Figure 7D:
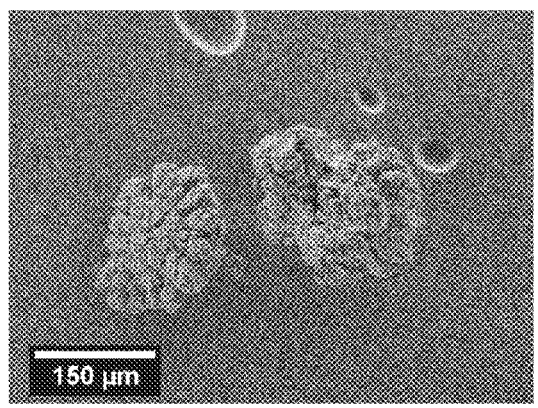
Figure 8:
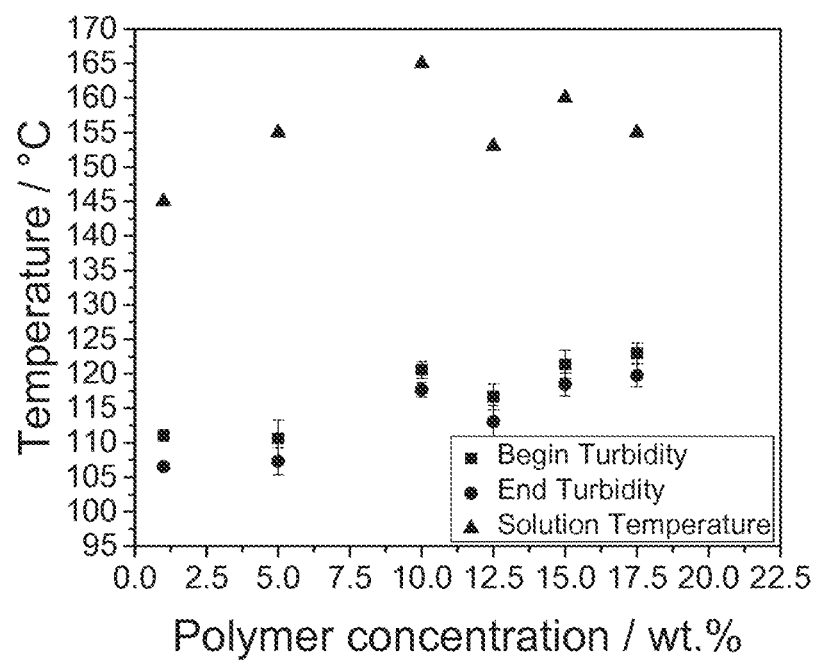
Figure 9:
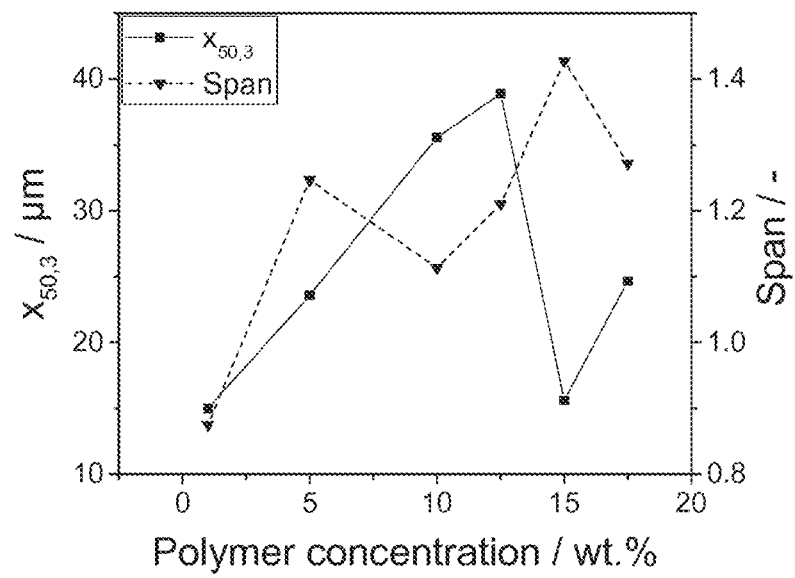
Figure 10:
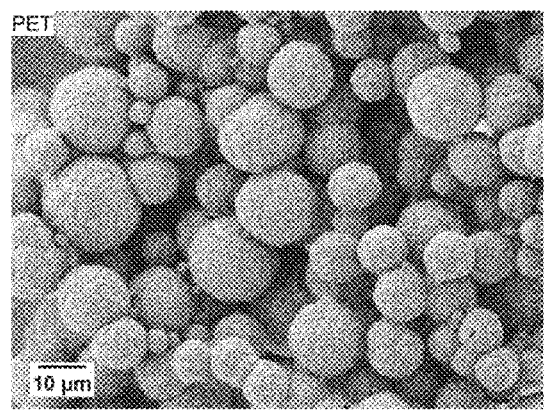
Figure 11:
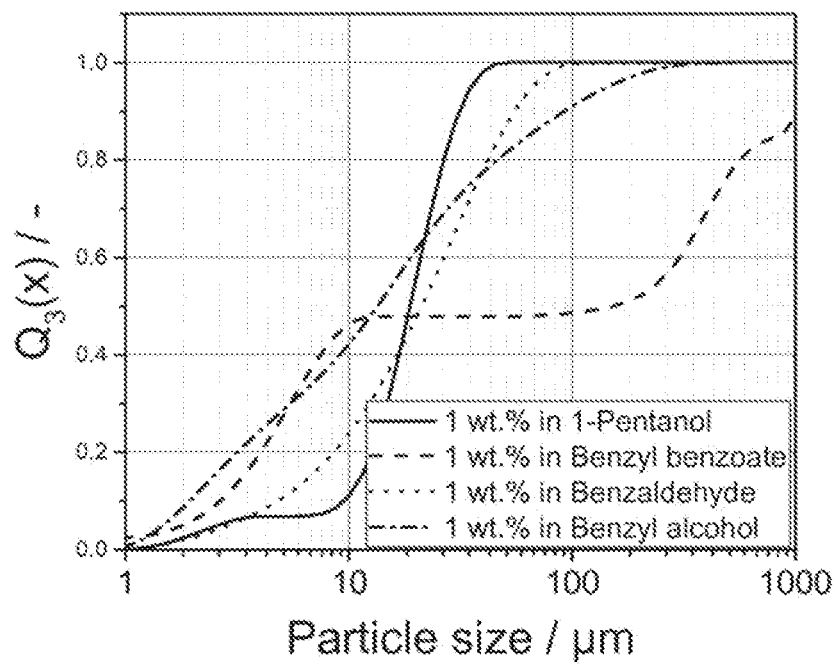
Figure 12:
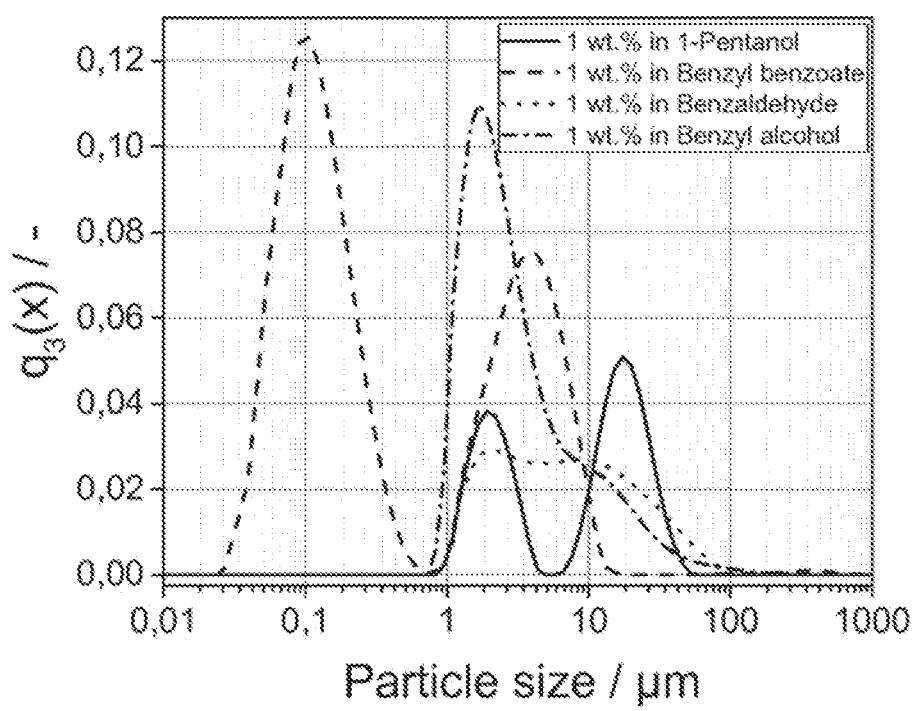
Figure 13A:
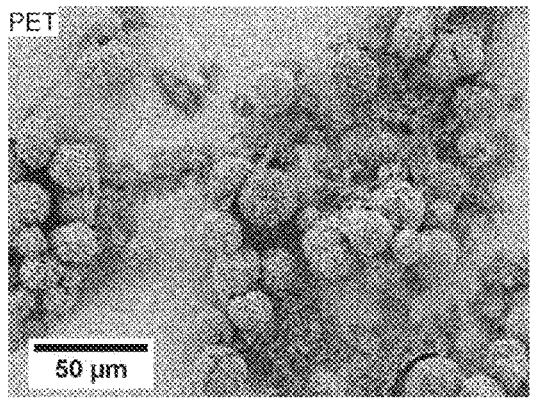
Figure 13B:
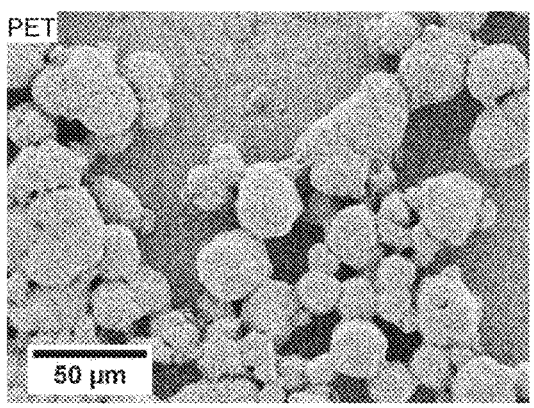
Figure 13C:
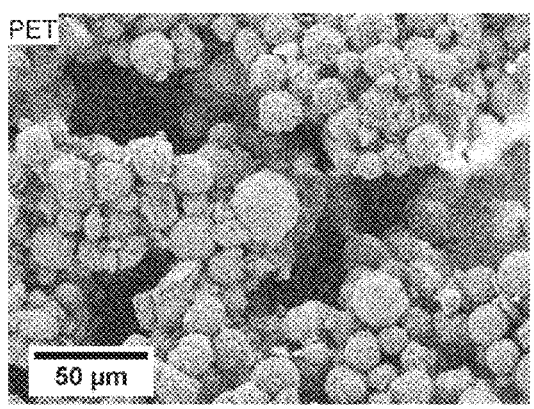
Figure 13D:
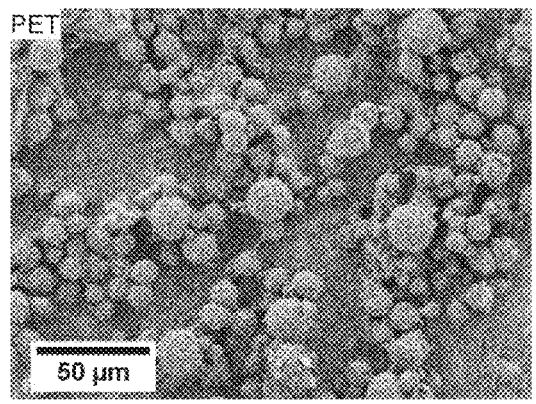
Figure 14:
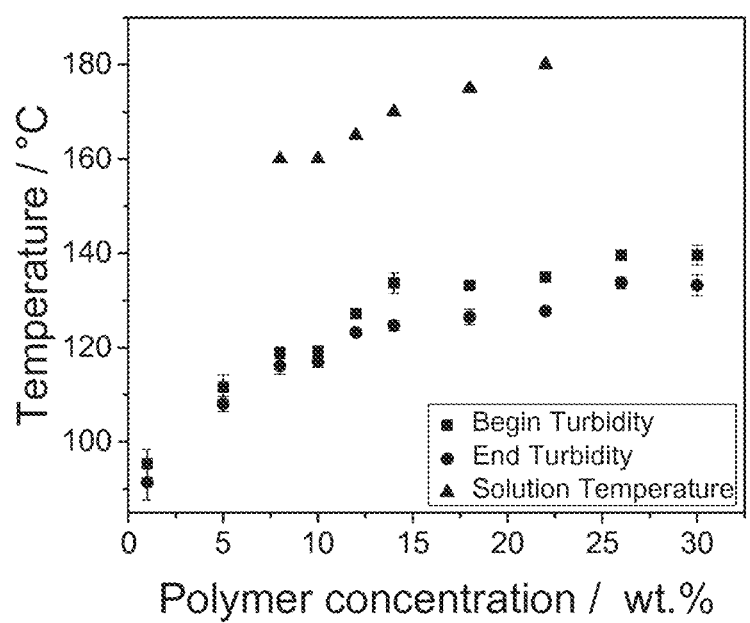
Figure 15:
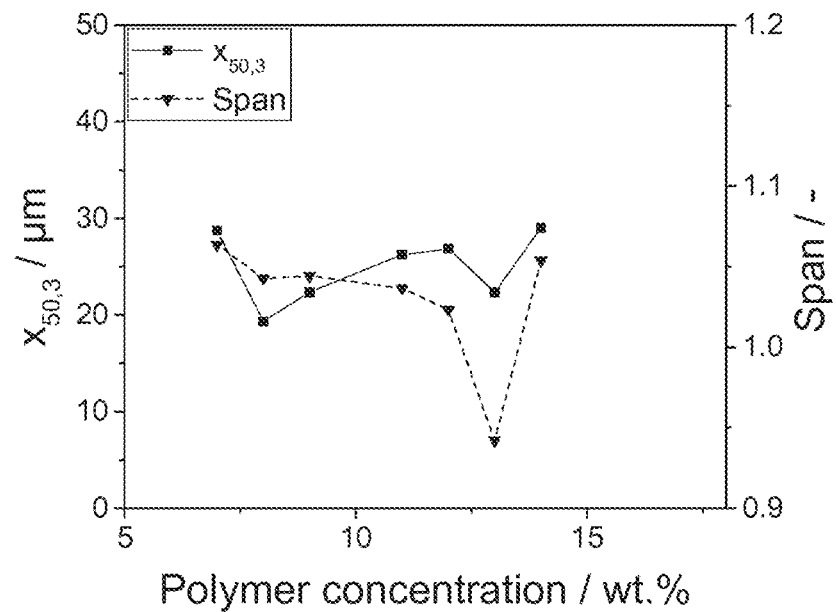
Figure 16:
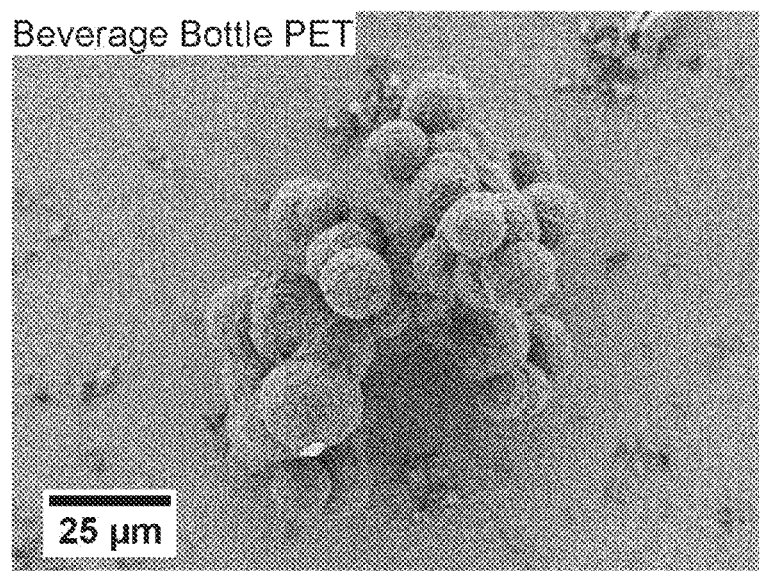

In the following the invention is described by means of examples:

FIG. 1 shows the first temperature (=solution temperature), second temperature (=begin turbidity) and third temperature (=end turbidity) for PBT dissolved in cyclopentanone at different concentrations, FIG. 2 shows a scanning electron microscope (=SEM) photograph of PBT particles precipitated from a solution of PBT in cyclopentanone, FIG. 3 shows particle sizes and spans of populations of particles formed from PBT dissolved in cyclopentanone as a function of the polymer concentration, FIG. 4 shows the particle size distribution of a population of particles precipitated from a solution of PBT in cyclopentanone comprising the additives Aerosil® R 106 and Tween® 85, FIG. 5 shows an SEM photograph of the surface of a PBT particle coated with Aerosil® R 106 which particle was precipitated from PBT dissolved in cyclopentanone comprising Aerosil® R 106 and Tween® 85, FIG. 6 shows particle size distributions of populations of PBT particles precipitated from solutions of PBT having different PBT concentrations in di(ethylene glycol) ethyl ethyl ether, FIGS. 7a to 7d show SEM photographs of PBT particles precipitated from solutions of PBT in different solvents, FIG. 8 shows the first temperature, the second temperature and the third temperature for PET dissolved in cyclopentanone at different concentrations, FIG. 9 shows particle sizes and spans of populations of particles precipitated from PET dissolved in cyclopentanone as a function of polymer concentration, FIG. 10 shows an SEM photograph of PET particles precipitated from PET dissolved in cyclopentanone, FIG. 11 shows cumulative distributions of particle sizes of populations of PET particles precipitated from solutions of PET in different solvents, FIG. 12 shows density distributions of particle sizes of populations of PET particles precipitated from solutions of PET in different solvents, FIGS. 13a to 13d show SEM photographs of PET particles precipitated from solutions of PET in different solvents, FIG. 14 shows the first temperature, the second temperature and the third temperature for PET from beverage bottles dissolved in cyclopentanone at different concentrations, FIG. 15 shows particle sizes and spans of populations of particles precipitated from a solution of beverage bottle PET in cyclopentanone and FIG. 16 shows an SEM photograph of PET particles precipitated from a solution of beverage bottle PET in cyclopentanone.

GENERAL EXPERIMENTAL PROCEDURE FOR PRODUCING A POPULATION OF PARTICLES OF A POLYMER

Preparations having a total weight of 40 g or 100 g were heated and stirred in an autoclave. Temperature was continuously measured by use of a thermal element. Furthermore, turbidity was constantly measured by use of a photometer. Turbidity can also be determined visually. After achieving the first temperature this temperature was maintained for 15 min. Then stirring and heating was stopped. Afterwards, the solution was cooled down, wherein temperature and turbidity were constantly measured and cooling down was controlled. After the solution achieved a temperature of 50° C. the autoclave was opened and the particles formed in the solution were separated from the solution by use of a suction filter. The particles on the filter were washed by use of ethanol. Then the particles were dried in a vacuum oven at about 600 mbar and 45° C. for about 24 hours. The resulting powder was sieved by use of a 200 µm mesh sieve for achieving a desagglomeration of the particles. Alternatively, the formation of agglomerates could have been prevented by agitating the particles during drying.

In case of the addition of at least one additive the additive was added to the solvent before dissolving the polymer. The dosage of the additive by weight given in the following refers to the mass of the polymer and does not take into account the total mass of the preparation.

Particle sizes have been determined from the suspension as volume equivalent spherical diameter (VESD) by laser diffraction using the Mastersizer 2000 purchased from Malvern Panalytical GmbH, Kassel, Germany.

SPECIFIC EXAMPLES

1. PBT

Experiment 1:

8 g PBT-granulate (Ultradur® B 4520, BASF SE, Ludwigshafen, Germany) were given in an autoclave together with 32 g cyclopentanone. Therefore, the PBT content in the preparation was 20 wt. %. The autoclave was closed and the preparation was stirred at 250 rpm. The preparation was heated to 250° C. 250° C. were maintained for 15 min for allowing a complete dissolving of the PBT in the cyclopentanone. Then heating and stirring were stopped and the solution was allowed to cool down at a rate of 1.3° C./min to about 50° C. Turbidity was measured in a separate procedure in which the PBT was dissolved in the same solvent at the same concentration. FIG. 1 shows the solution temperature, i. e. the temperature at which turbidity of the solution disappeared as a result of a complete solving of the polymer in the solvent when heating the solution. FIG. 1 further shows that the second temperature at which turbidity began was about 143° C. The third temperature at which increase of turbidity stopped was reached at about 138° C.

The experiment was performed at a polymer concentration of 20%. FIG. 1 also shows the results for other concentrations indicating that the first, second and third temperature depend on the polymer concentration.

After a temperature of about 50° C. was reached the autoclave was opened and the formed particles were separated from the solution by suction separation using a suction filter in the form of a Büchner funnel comprising a paper filter. The particles on the paper filter were washed with ethanol. Afterwards the particles were dried in a vacuum drying oven at a pressure of about 600 mbar and 45° C. for about 24 hours. Since no agitation occurred during drying, agglomerates formed during the process were not destroyed. For desagglomeration the agglomerated particles were agitated in a 200 µm mesh sieve until no residues remained on the sieve. A scanning microscope (=SEM) photograph of the resulting particles is shown in FIG. 2. From FIG. 2 it can be seen that the particles are very spherical. The particles have a maximal melting temperature of 222.6° C. and a maximal crystallization temperature of 190.9° C. The temperature range in which the particles can be processed in an SLS procedure is about 9° C. corresponding to the temperature range between the onset of melting and the offset of crystallization.

Resulting particle sizes are shown in FIG. 3, wherein $x_{50,3}$, i. e. the volume equivalent spherical diameter were 50% of the particle population lies below, and the span are given as a function of polymer concentration. Polymer concentration in this and other figures is always given in percent by weight (=wt. %). As can be seen from FIG. 3 the particles have a mean size of about 70 µm. The span is about 1.2 which is considered as a narrow particle size distribution.

Experiment 2:

The process was performed as described in example 1 differing only by an addition of 5 wt. % Aerosil® R 106 and 5 wt. % Tween® 85. The resulting population of particles comprised no fine particles and had a mean particle size of about 75 µm and a span of 1.11. The particle size distribution is given in FIG. 4. The meanings of $Q_3(x)$ and $q_3(x)$ are as follows:

$Q_3(x)$: Volume cumulative distribution of the particle size x, wherein the particle size is defined as volume equivalent spherical diameter (VESD) normalized to the value 1 for the cumulative volume of all particles. If $Q_3(x)$ is 0.5 half of all of the particles have a volume that is equal or smaller than that of the particles having the VESD corresponding to that value. This diameter is designated as $x_{50,3}$ or mean diameter.

$q_3(x)$: Frequency distribution indicating frequency of particles having a specific VESD.

FIG. 5 shows an SEM photograph of the surface of an obtained particle. It can be seen that the Aerosil® R 106 had been deposited on the surface of the particle. The Aerosil® R 106 functions as a flow enhancing additive.

Experiment 3:

The experiment was performed as experiment 1 but with benzyl alcohol, benzaldehyde and di(ethylene glycol) ethyl ether as solvents and polymer concentrations of 1 wt. % and 3 wt. %. The corresponding particle size distributions for ethylene carbonate and di(ethylene glycol) ethyl ether as solvents are shown in FIG. 6.

SEM photographs of particles obtained from PBT dissolved in benzaldehyde at a concentration of 1 wt. %, in benzyl alcohol at a concentration of 1 wt. %, in di(ethylene glycol) ethyl ether at a concentration of 1 wt. % and in 2-pyrrolidone at a concentration of 1 wt. % are shown in FIGS. 7a to 7d as follows:

FIG. 7a: Benzaldehyde
FIG. 7b: Benzyl alcohol
FIG. 7c: Di(ethylene glycol) ethyl ether
FIG. 7d: 2-Pyrrolidone Particles formed from a 2-pyrrolidone solution show a non-spherical cauliflower-like shape.

Experiment 4:

In order to measure the molar mass distribution, PBT was dissolved in hexafluoroisopropanol (HFIP).The solutions were analyzed using triple detection Gel permeation chromatography (GPC) (Viscotek TDA 305, Malvern Panalytical Ltd, United Kingdom) with refractive index, viscometer and light scattering detector. Molar masses Mw were calculated from light scattering.

Measurements:

| Sample | PBT-Feed material (Ultradur B 4520, BASF) | PBT-particles precipitated from 2-pyrrolidone | PBT-particles precipitated from propylene carbonate | PBT-particles precipitated from cyclopentanone |
|---|---|---|---|---|
| Mw/kDa | 43.385 | 6.642 | 17.989 | 41.226 |

When comparing the above results the degradation of the polymer during the procedure of producing the particles vis-à-vis the PBT-feed material can be determined as follows:

| Sample | PBT-feed material | PBT-particles precipitated from cyclopentanone | PBT-particles precipitated from propylene carbonate | PBT-particles precipitated from 2-pyrrolidone |
|---|---|---|---|---|
| Absolute degradation/ kDa | — | 2.159 | 25.396 | 36.743 |
| Relative degradation/ % | — | 4.98 | 58.54 | 84.69 |

The above results show that propylene carbonate and 2-pyrrolidone known in the art as solvents for the production of polymer particles result in an extensive degradation of the polymer whereas cyclopentanone results only in a very small degradation of the polymer.

2. PET

Experiment 5:

5 g PET granulate Arnite® A04 900 purchased from DSM Engeneering Plastics B. V., Geleen, The Netherlands were dissolved in 35 g cyclopentanone resulting in a polymer concentration of 12.5 wt. %. The solvent with the granulate was heated in an autoclave to 270° C. and stirred with 250 rpm. The temperature was maintained for 15 min. Then heating and stirring was stopped. The obtained solution was cooled to 50° C. with a rate of 0.87° C./min. The second temperature, i.e. the temperature when clouding of the solution started, was at about 123° C. Separation of the particles from the solution, washing, drying and desagglomeration were performed as described for experiment 1. The mean VESD was about 38.9 μm and the span was 1.27.

FIG. 8 shows the first, second and third temperatures determined with different polymer concentrations. FIG. 9 shows the obtained mean particle size and the span as a function of polymer concentration. FIG. 10 shows an SEM photograph of the obtained PET particles. As can be seen from FIG. 10 most of the particles have a spherical form.

Experiment 6:

PET granulate Arnite® A04 900 was dissolved at a polymer concentration of 1 wt. % in 1-pentanol, benzyl benzoate and benzaldehyde, respectively by heating in an autoclave to 200° C. and stirring with 250 rpm. The temperature was maintained for 15 min. Then heating and stirring was stopped. The obtained solution was cooled to about 50° C. with a cooling rate of about 1.4° C./min. Separation of the particles from the solution, washing, drying and desagglomeration were performed as described for experiment 1. The particle size distributions of the resulting populations of particles are shown in FIGS. 11 and 12.

SEM photographs of particles obtained from the above mentioned solvents are shown in FIGS. 13a to 13d as follows:

FIG. 13a: 1-Pentanol

FIG. 13b: Benzyl alcohol

FIG. 13c: Benzyl benzoate

FIG. 13d: Benzaldehyde

Experiment 7:

The PET used for this experiment was from beverage bottles. This PET is frequently modified with glycol and/or isophthalic acid and 1,4-cyclohexanedimethanol as comonomers. The material may also be modified by $SiO_2$ deposited by use of a chemical vapor deposition process on the surface for increasing gas impermeability.

When using PET beverage bottles, polymer concentrations of at least 21 wt. % can still be used for producing spherical particles. Particles obtained in this way have a very good flowability. Furthermore, the particles of the powder produced in this way have a pronounced semicrystalline feature resulting in a good suitability for an SLS procedure. Therewith the method according to the invention is suitable for an upcycling process from PET beverage bottles to a powder construction material.

For performing the experiment with beverage bottle PET, 5.6 g pieces of a PET beverage bottle and 34.4 g cyclopentanone corresponding to a polymer concentration of 14 wt. % were heated in an autoclave to a temperature of 230° C. and stirred with 250 rpm. The temperature was maintained for 15 min. Then heating and stirring was stopped and the solution was cooled to about 50° C. with a cooling rate of about 1.2° C./min. The second temperature was determined to be about 133° C. The first, second and third temperatures determined for different concentrations of PET from beverage bottles dissolved in cyclopentanone are shown in FIG. 14.

Separation, washing, drying and desagglomeration were performed as described for experiment 1. The mean VESD of the population of particles was about 30 μm. The span was 1.05. Particle sizes and particle size distributions obtained with different concentrations of PET from beverage bottles dissolved in cyclopentanone are shown in FIG. 15. FIG. 16 shows an SEM photograph of the particles obtained from PET from a beverage bottle dissolved in cyclopentanone. As can be seen from FIG. 16 most of the particles are spherical.

Experiment 8:

For analyzing residual entrapped solvent amount present in PBT particles after drying of the particles in a vacuum drying oven at a pressure of about 600 mbar and 45° C. for about 24 hours, thermogravimetric analyses were conducted. The dried particles were obviously dry and flowable. Thermogravimetric analyses were performed in a TGA Q50 purchased from TA Instruments, New Castle, Del. 19720, USA. Amounts of 30 to 50 mg of the dried PBT particles precipitated in each case from a 25 wt. % solution of PBT in propylene carbonate, 2-pyrrolidone, gamma-butyrolactone and cyclopentanone, respectively, were weighed in ceramic sample holders and heated from room temperature to 900° C. at a rate of 10° C./min under synthetic air atmosphere while constantly measuring sample weights. The loss of solvent could be attributed to the total weight loss of the sample in the temperature range from room temperature to 300° C. At 300° C. PBT was fully molten but no thermal degradation happened. 300° C. was above the boiling points of the used solvents. A second weight loss happened above 450° C. and could be attributed to the complete thermal degradation of the polymer. In below Table II weight loss is given as percentage of total initial sample weight.

TABLE II

| Particles precipitated from 25 wt. % PBT dissolved in | Cyclopentanone | 2-Pyrrolidone | Propylene carbonate | Gamma-butyrolactone |
|---|---|---|---|---|
| Weight loss up to 300° C./% | 0.83 | 1.62 | 13.60 | 3.37 |

The results show that PBT particles precipitated from cyclopentanone contain a much smaller amount of residual solvent than PBT particles precipitated from propylene carbonate and a smaller amount of residual solvent than PBT particles precipitated from 2-pyrrolidone and gamma-butyrolactone.

In a further experiment PET particles were precipitated in each case from a 20 wt. % solution of PET in dimethyl phthalate and cyclopentanone, respectively, were weighed in ceramic sample holders and heated from room temperature to 900° C. at a rate of 10° C./min under synthetic air atmosphere while constantly measuring sample weights. In below Table III weight loss is given as percentage of total initial sample weight.

TABLE III

| Particles precipitated from 20 wt. % PET in | Cyclopentanone | Dimethyl phthalate |
|---|---|---|
| Weight loss up to 300° C./% | 0.61 | 31.81 |

The results show that PET particles precipitated from cyclopentanone contain a much smaller amount of residual solvent than PET particles precipitated from dimethyl phthalate.

The results of experiment 8 show the superiority of cyclopentanone as solvent for the precipitation of the particles.

The invention claimed is:

1. A method for producing a population of particles of a polymer, wherein the polymer is polybutylene terephthalate (=PBT) or polyethylene terephthalate (=PET) or a copolymer comprising polybutylene terephthalate and/or polyethylene terephthalate, wherein the polymer is dissolved in an organic solvent which solvent is selected such that it completely solubilizes the polymer only at a temperature of the solvent above 100° C., comprising:
   a) heating the solvent and the solid polymer immersed in the solvent at least to a first temperature, at which first temperature the polymer completely dissolves as indicated by a resulting solution showing no turbidity, wherein the weight of the polymer in relation to the total weight of the solvent and the polymer is in the range of 0.25 wt. % to 50 wt. %,
   b) cooling the solution, wherein the cooling is practiced until a second temperature is reached at which second temperature clouding of the solution starts,
   c) further cooling the solution at a rate in a range of 0.05° C./min to 5° C./min or keeping the solution at the second temperature or at a temperature up to 3° C. below the second temperature for at least 5 min and then cooling the solution at a rate in a range of 0.05° C./min to 5° C./min, wherein cooling occurs at least until a third temperature is reached at which third temperature turbidity does not further increase, and
   d) separating the particles formed during step b) or c) from the solution,
   wherein independently for each of steps a), b) and c) either turbidity of the solution is measured during the respective step or the first, second and third temperature, respectively, is determined in a separate procedure, wherein the solvent in which the PBT or the PBT comprising copolymer is dissolved in step a) is at least one solvent selected from the group consisting of a cyclic ketone, a lactone, an aromatic alcohol, an aromatic aldehyde, an aromatic ester comprising only one ester group or a glycol ether comprising at most 10 carbon atoms in total and the solvent, in which the PET or the PET comprising copolymer is dissolved in step a) is at least one solvent selected from the group consisting of a cyclic ketone, a lactone, an aromatic alcohol or a non-aromatic cyclic or an aliphatic alcohol, an aromatic aldehyde or an aromatic ester comprising only one ester group,
   wherein turbidity is determined by a light-scattering technique.

2. The method according to claim 1, wherein the cyclic ketone contains at least 4 carbon atoms in its ring structure, the lactone is gamma-butyrolactone, the aromatic aldehyde is benzaldehyde, the aromatic alcohol is benzyl alcohol, the aliphatic alcohol is 1-pentanol, the aromatic ester is benzyl benzoate and the glycol ether is di(ethylene glycol) ethyl ether.

3. The method according to claim 1, wherein the solvent is an aromatic alcohol which is benzyl alcohol.

4. The method according to claim 1, wherein the solvent is a cyclic ketone which is cyclopentanone or cyclohexanone.

5. The method according to claim 1, wherein the solution is kept at the second temperature in step c) for a time in the range of 5 min to 150 min.

6. The method according to claim 1, wherein cooling in step b) is interrupted at a fourth temperature in the range of 12° C. to 0.01° C. above the second temperature by keeping the solution at said fourth temperature for at least 5 min, wherein the second temperature is determined before in a separate procedure.

7. The method according to claim 6, wherein the solution is kept at the fourth temperature in step b) for a time in the range of 5 min to 150 min.

8. The method according to claim 1, wherein the solvent and/or the solution are/is agitated during steps a) to c).

9. The method according to claim 8, wherein the solution is agitated during step c) such that a laminar flow forms in the predominant part of the solution which laminar flow is maintained at least during the predominant time of performance of step c).

10. The method according to claim 1, wherein the solvent has a total Hansen solubility parameter in the range of 20.1 MPa$^{1/2}$ to 25.7 MPa$^{1/2}$.

11. The method according to claim 1, wherein a Hausner ratio of the particles is between 1.00 and 1.25 and/or 50% of the particles have a volume equivalent spherical diameter (=VESD) that is smaller than or equal to 10 μm to 150 μm and/or a span of the particles is in the range of 1.0 to 1.75, wherein the span is defined as the ratio of the difference between the VESD where 90% of the particle population lies below (=$x_{90,3}$) and the VESD where 10% of the particle population lies below (=$x_{10,3}$) to the VESD where 50% of the particle population lies below (=$x_{50,3}$).

12. The method according to claim 1, wherein the first temperature is a temperature below the melting point or melting range of the polymer.

13. The method according to claim 1, comprising adding at least one of pyrogenic silica, pyrogenic metal oxide, carbon black, a pigment, an antistatic agent, a flame retarding agent, a thermally stabilizing agent, an antioxidant and a polysorbate to the solvent in step a) or to the solution during step a) or step b) before the second temperature is reached.

14. The method according to claim 1, wherein the particles separated from the solution in step d) are washed and/or dried and/or de-agglomerated.

15. The method according to claim 1, wherein the weight of the polymer in relation to the total weight of the solvent and the polymer is in the range of 0.5 wt. % to 40 wt. %.

* * * * *